US012802662B2

(12) United States Patent
Greenebaum et al.

(10) Patent No.: US 12,802,662 B2
(45) Date of Patent: Nov. 17, 2026

(54) DYNAMIC SYSTEM OPTICAL-TO-OPTICAL TRANSFER FUNCTIONS (OOTF) FOR PROVIDING A PERCEPTUAL REFERENCE

(71) Applicant: Apple Inc., Cupertino, CA (US)

(72) Inventors: Kenneth I. Greenebaum, San Carlos, CA (US); Robert L. Ridenour, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/113,737

(22) PCT Filed: Sep. 20, 2023

(86) PCT No.: PCT/US2023/033298
§ 371 (c)(1),
(2) Date: Mar. 20, 2025

(87) PCT Pub. No.: WO2024/064238
PCT Pub. Date: Mar. 28, 2024

(65) Prior Publication Data

US 2026/0141876 A1 May 21, 2026

Related U.S. Application Data

(60) Provisional application No. 63/376,540, filed on Sep. 21, 2022.

(51) Int. Cl.
*G09G 5/02* (2006.01)
*H04N 1/60* (2006.01)

(52) U.S. Cl.
CPC ............ *G09G 5/02* (2013.01); *H04N 1/6066* (2013.01); *H04N 1/6088* (2013.01);
(Continued)

(58) Field of Classification Search
None
See application file for complete search history.

(56) References Cited

U.S. PATENT DOCUMENTS 7,830,566 B2 * 11/2010 Yamada .................. H04N 1/60 358/1.9
2012/0081279 A1 * 4/2012 Greenebaum ........... G09G 5/02 345/207

(Continued)

*Primary Examiner* — Mushfikh I Alam
(74) *Attorney, Agent, or Firm* — Blank Rome LLP

(57) ABSTRACT

Disclosed are dynamic system optical-to-optical transfer functions (OOTF), which adapt displayed content to provide a so-called "perceptual reference" effect for the viewer, wherein, as the current viewing conditions depart from a "reference" viewing scenario, the dynamic system OOTF adapts the content and/or display to provide the viewer with as close as possible to the perceptual effect of the "reference" viewing scenario. The dynamic system OOTF may perform one or more of the following adaptation processes: adapting media content from a source color space to a linear XYZ color space; adapting media content from a linear XYZ color space to a display device's color space; automatically adjusting display device brightness, white point, and/or black point; adapting media content from an intended viewing environment to a common compositing space's fixed viewing environment; and/or adapting media content from the common compositing space's fixed viewing environment to that of the viewer's current viewing conditions.

14 Claims, 10 Drawing Sheets

(52) U.S. Cl.
CPC ............... *G09G 2320/0276* (2013.01); *G09G 2320/066* (2013.01); *G09G 2320/0666* (2013.01); *G09G 2320/0673* (2013.01); *G09G 2340/06* (2013.01); *G09G 2360/144* (2013.01)

(56) References Cited

U.S. PATENT DOCUMENTS

| | | | | |
|---|---|---|---|---|
| 2012/0321273 | A1* | 12/2012 | Messmer | H04N 9/8205<br>386/E5.028 |
| 2014/0043354 | A1 | 2/2014 | Choi | |
| 2015/0358646 | A1* | 12/2015 | Mertens | G06T 5/92<br>382/166 |
| 2016/0142714 | A1* | 5/2016 | Toma | H04N 21/84<br>375/240.25 |
| 2017/0070681 | A1* | 3/2017 | Nattress | G09G 5/10 |
| 2017/0200405 | A1* | 7/2017 | Li | H04N 1/60 |
| 2017/0310981 | A1* | 10/2017 | Agostinelli | H04N 19/117 |
| 2018/0007374 | A1* | 1/2018 | Atkins | H04N 19/85 |
| 2020/0105226 | A1* | 4/2020 | Greenebaum | G09G 5/10 |
| 2020/0380938 | A1 | 12/2020 | Greenebaum | |

* cited by examiner

DYNAMIC SYSTEM OPTICAL-TO-OPTICAL TRANSFER FUNCTIONS (OOTF) FOR PROVIDING A PERCEPTUAL REFERENCE

CROSS-REFERENCE TO RELATED APPLICATIONS

This application claims priority to U.S. Provisional Patent Application Ser. No. 63/376,540 ("the '540 application"), filed Sep. 2, 2022. This application is also related to commonly-assigned U.S. Pat. No. 11,386,875 ("the '875 patent"). The '540 application and '875 patent are hereby incorporated by reference in their entireties.

BACKGROUND

Today, consumer electronic devices with display screens are used in many different environments with many different lighting conditions, e.g., the office, the home, home theaters, inside head-mounted displays (HMD), and outdoors. Devices typically need to be designed so that—no matter what the user's viewing environment is at any given moment—there is only minimal (or, ideally, no) color banding perceivable to the viewer, and the displayed content has consistent appearance and tonality. Many content items are authored for particular display devices and viewing environments. For example, movies are often authored for Rec.709 displays to be viewed in in dark viewing environments. Devices typically need to be able to adapt content items to many different types of intended display devices and many different viewing environments, such that the content items appear as the content authors intended them to be perceived—no matter what the current viewing conditions around the display device are like.

For these reasons and more, it is desirable to map each content item to a shared, system-level viewing environment, also referred to herein as a "common compositing space," and then from the shared, system-level viewing environment to the current viewing environment. Thus, there is a need for techniques to implement an dynamic system-level optical-to-optical transfer function (OOTF) that is capable of utilizing an ambient conditions model (and a number of other display-related factors) to automatically adjust a display's overall content adaptation process, e.g., to provide a so-called "perceptual reference," such that, when the dynamic viewing scenario corresponds exactly to the "reference" viewing scenario, a measurably accurate reference response is provided by the display device (e.g., as may be quantified via an optical instrument measuring brightness off the face of the display device), and then, as the viewing scenario departs from the "reference" viewing scenario, the dynamic system OOTF adapts, so as to provide the viewer with as close to the perceptual effect in the "non-reference" viewing scenario as they would have experienced in the "reference" viewing scenario. Successfully modeling the user's current viewing environment and its impact on the perception of the displayed content would allow the user's perception of the displayed content to remain relatively independent of the ambient conditions in which the display device is being viewed and/or any other content items being displayed simultaneously.

SUMMARY

As mentioned above, human perception is not absolute; rather, it is relative. In other words, a human viewer's perception of a displayed image changes based on what surrounds the image, the image itself, and what brightness and white point the viewer is presently adapted to. A display may commonly be positioned in front of a wall. In this case, the ambient lighting in the room (e.g., brightness and color) illuminates the wall behind the display and changes the viewer's perception of the displayed image. Potential changes in a viewer's perception of the displayed content include tonality changes (which may be modeled using a gamma function), as well as changes to white point (i.e., the absolute color perceived as being white) and black point (i.e., the highest brightness level indifferentiable from true black).

Thus, while some devices may attempt to maintain a consistent content adaptation on the display device throughout the encoding, decoding, and color management processes, this does not take into account the effect environmental conditions around the display device may have on a viewer's perception of displayed content. Many color-management systems attempt to consistently map the content to the display, such that the content's encoding and the display's reproduction do not influence the resulting displayed content, thus providing consistency across content encoding and displays. However, these color-management systems require fixed viewing conditions, such as always using the intended display and suggested "reference" viewing environment.

According to various embodiments described herein, a processor in communication with the display device executing a dynamic system OOTF may adapt a wide variety of constrained parameters to provide the so-called "perceptual reference" effect for the viewer. For example, the dynamic system OOTF may perform one or more of the following adaptation processes: adapting media content from a source color space to a linear XYZ color space; adapting media content from a linear XYZ color space to a display device's color space; automatically adjusting display device brightness; automatically adjusting display device white point; automatically adjusting display device black point; adapting media content from an intended viewing environment to a common compositing space's fixed viewing environment; and/or adapting media content from the common compositing space's fixed viewing environment to that of the viewer's actual current viewing conditions.

Another adaptation process, called the "simultaneous contrast adaptation" process, maps each content item to its suggested viewing environment using techniques indicated in the content item by content indicators. For example, a content item intended for viewing on a Rec.709 display includes content indicators to use an RGB-space gamma. The resulting, simultaneous contrast-adapted content item is referred to herein as color space data for the suggested viewing environment.

The dynamic system OOTF techniques disclosed herein provide an extension of classic color management systems (which typically match content to the color space of the display device provided, while requiring that the viewing environment of the source content be reproduced in the viewer's actual viewing environment) by providing adaptation for the viewer's actual viewing environment, which can be important, especially for mobile devices that are used in a wide variety of viewing environments, as well as movie content, which may, e.g., be consumed in a sun-lit living room rather than the intended dark movie theater viewing environment.

Further, authoring content in a viewing environment that does not match the intended viewing environment may also result in biases being included in the content itself, and thus result in an incorrect appearance when the content is viewed in the intended viewing environment. Authoring content under "non-reference" environmental conditions—but while the viewer is adapted to the so-called "perceptual reference," e.g., as provided by the application of the dynamic system OOTF techniques described herein-helps to ensure that environmental biases are minimized or avoided and that the resulting edited content, which may even have been authored in a changing, i.e., dynamic, environment, will have the correct appearance when viewed in the intended viewing environment.

The techniques disclosed herein use a display device, in conjunction with various optical sensors, e.g., ambient light sensor(s), multi-spectral ambient light sensor(s), image sensor(s), or video camera(s), to collect information about the ambient conditions in the current viewing environment of a viewer of the display device. Use of these various optical sensors can provide more detailed information about the ambient lighting conditions, which the processor may utilize to evaluate a unified display model comprising an ambient conditions model and/or a perceptual adaptation model, based, at least in part, on the received environmental information and information about the display, such as the display's peak brightness, leakage percentage, reflection percentage, reference brightness (SDR max), white point, as well as the instantaneous, historic, and even future content itself that is being, has been, or will be displayed to the viewer.

The output from the unified display model may be used to adapt the content, such that the viewer's perception of the content displayed on the display device is relatively independent of the ambient viewing conditions in which the display is being viewed, what the viewer sees on (and beyond) the display, and hence how the viewer's vision is adapted. The output of the unified display model may comprise modifications to the display's transfer function, gamma boost, tone mapping, re-saturation, black point, white point, or a combination thereof.

Thus, according to some embodiments, a non-transitory program storage device comprising instructions stored thereon is disclosed. When executed, the instructions are configured to cause one or more processors to: receive data indicative of a first content item; linearize the data indicative of the first content item according to an inverse transfer function associated with the first content item; map the linearized data indicative of the first content item from a first color space gamut associated with the first content item to a second color space gamut associated with a common compositing space; modify the mapped, linearized data indicative of the first content item based on at least one of: (a) a first difference between a first intended viewing condition associated with the first content item and a second intended viewing condition associated with the common compositing space; and (b) a second difference between a first intended viewer adaptation level associated with the first content item and a first predicted viewer adaptation level; and encode the modified data indicative of the first content item according to a transfer function associated with the common compositing space.

In some embodiments, the non-transitory program storage device further comprises instructions stored thereon to cause the one or more processors to: re-linearize the encoded data indicative of the first content item according to an inverse transfer function associated with the common compositing space; map the re-linearized data indicative of the first content item from the second color space gamut associated with the common compositing space to a third color space gamut associated with the display device; apply a chromatic adaptation operation to the mapped, re-linearized data indicative of the first content item based on a measured white point of a current viewing condition around the display device; perform a simultaneous contrast adaptation on the first content item based on a third difference between the second intended viewing condition associated with the common compositing space and the current viewing condition around the display device; and display the first content item on the display device.

In some embodiments, the non-transitory program storage device further comprises instructions stored thereon to cause the one or more processors to receive and similarly process a second content item, e.g., according to the second content item's inverse transfer function and color space gamut, into the common compositing space and then further adjusted based on the current viewing conditions around the display device, wherein the second content item may comprise a content item with a different media type, color space, dynamic range, etc., than the first content item that it is being simultaneously displayed with on the display device. In other words, the non-transitory program storage device may further comprise instructions stored thereon to cause the one or more processors to: receive data indicative of a second content item; linearize the data indicative of the second content item according to an inverse transfer function associated with the second content item; map the linearized data indicative of the second content item from a fourth color space gamut associated with the second content item to the second color space gamut associated with a common compositing space; modify the mapped, linearized data indicative of the second content item based on at least one of: (c) a fourth difference between a third intended viewing condition associated with the second content item and the second intended viewing condition associated with the common compositing space; and (d) a fifth difference between a second intended viewer adaptation level associated with the second content item and a second predicted viewer adaptation level; and encode the modified data indicative of the second content item according to the transfer function associated with the common compositing space.

The non-transitory program storage device may then further cause the one or more processors to: re-linearize the encoded data indicative of the second content item according to the inverse transfer function associated with the common compositing space; map the re-linearized data indicative of the second content item from the second color space gamut associated with the common compositing space to the third color space gamut associated with the display device; apply the chromatic adaptation operation to the mapped, re-linearized data indicative of the second content item based on the measured white point of the current viewing condition around the display device; perform a simultaneous contrast adaptation on the second content item based on the third difference between the second intended viewing condition associated with the common compositing space and the current viewing condition around the display device; and display the second content item on the display device.

In other embodiments, the aforementioned techniques embodied in instructions stored on non-transitory program storage devices may also be practiced as methods and/or implemented on electronic devices having display devices, e.g., a mobile phone, PDA, HMD, monitor, television, or a laptop, desktop, or tablet computer.

DETAILED DESCRIPTION

Figure 1A:
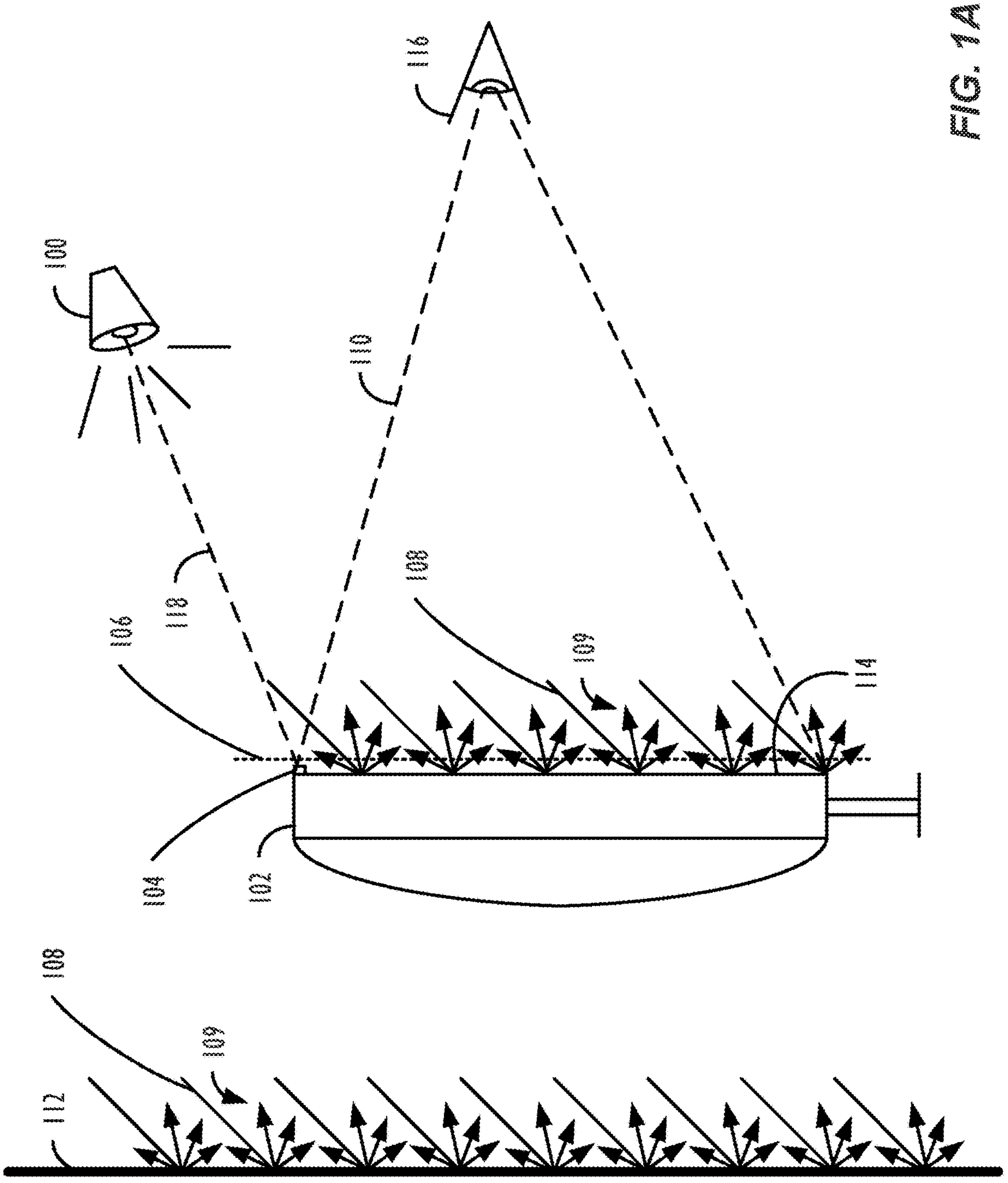
FIG. 1A illustrates the properties of ambient lighting, diffuse reflection off a display device, and other environmental conditions influencing a display device.

The disclosed techniques use a display device, in conjunction with various optical sensors, e.g., ambient light sensors or image sensors, to collect information about the ambient conditions in the environment of a viewer of the display device. Use of the ambient environment information; information regarding the display device and its characteristics; and information about the content being displayed, its intended display type, and its suggested viewing environment can provide a more accurate prediction of the viewer's current viewing environment and its impact on how the user perceives the displayed content. A processor in communication with the display device may evaluate an ambient conditions model and/or a perceptual adaptation model as part of a unified display model to predict the effects of the current ambient viewing conditions (and/or the content itself) on the viewer's perception. The output of the unified display model may be suggested modifications that are used to perform environmental adaptation on the content to be displayed and parameters of the display device itself (e.g., suggested adjustments to the gamma, black point, white point, and/or saturation), such that the viewer perceives the adapted display content as intended, while remaining relatively independent of the current ambient conditions.

The techniques disclosed herein are applicable to any number of electronic devices: such as digital cameras, digital video cameras, mobile phones, personal data assistants (PDAs), head-mounted display (HMD) devices, monitors, televisions, digital projectors (including cinema projectors), as well as desktop, laptop, and tablet computer displays.

In the interest of clarity, not all features of an actual implementation are described in this specification. It will, of course, be appreciated that in the development of any such actual implementation (as in any development project), numerous decisions must be made to achieve the developers' specific goals (e.g., compliance with system- and business-related constraints), and that these goals will vary from one implementation to another. It will be appreciated that such development effort might be complex and time-consuming, but they would nevertheless be a routine undertaking for those of ordinary skill having the benefit of this disclosure. Moreover, the language used in this disclosure has been principally selected for readability and instructional purposes, and it therefore may not have been selected to delineate or circumscribe the inventive subject matter, with resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Background on Exemplary Display Device Properties and Ambient Viewing Conditions Referring now to FIG. 1A, the properties of ambient lighting, diffuse reflection off a display device 102, and other environmental conditions influencing the display device are shown via the depiction of a side view of a viewer 116 of the display device 102 in a particular ambient lighting environment. As shown in FIG. 1A, viewer 116 is looking at display device 102, which, in this case, is a typical desktop computer monitor. Dashed lines 110 represent the viewing angle of viewer 116. The ambient environment, as depicted in FIG. 1A, is lit by environmental light source 100, which casts light rays 108 onto all of the objects in the environment, including wall 112, as well as the display surface 114 of display device 102. As shown by the multitude of small arrows 109 (representing reflections of light rays 108), a certain percentage of incoming light radiation will reflect off of the surface that it shines upon. Diffuse reflection may be defined as the reflection of light from a surface such that an incident light ray is reflected at many angles, and it has a particular effect on a viewer's perception of display device 102.

When the brightness of reflected light and/or the brightness of light leakage from display device 102 is greater than the brightness of pixels driven by the display device for a content item, the viewer may not be able to perceive low tonal details in the content item. This effect is illustrated by dashed line 106 in FIG. 1A, which indicates a threshold brightness level. When the brightness of pixels in the emissive display surface 114 is less than the threshold brightness level indicated by dashed line 106, the pixels are not perceived as intended. When the brightness of pixels in the emissive display surface 114 is greater than the threshold brightness level, the pixels are perceived as intended. The dashed line 106 and the threshold brightness level may be adjusted to account for each of the reflected light and light leakage from the display device 102, either alone or in combination. The influence of reflected light and light leakage from the display device on the viewer's perception of displayed content is described further herein with respect to FIG. 1B. Information regarding diffuse reflection and other ambient light in the current viewing environment may be used to inform an ambient conditions model that suggests which adaptation processes to perform on content to compensate for environmental conditions and/or suggests modifications to adaptation processes already being performed.

The information regarding diffuse reflection and other ambient light may be based off of light level readings recorded by one or more optical sensors, e.g., ambient light sensor 104. Dashed line 118 represents data indicative of the light source being collected by ambient light sensor 104. Optical sensor 104 may be used to collect information about the ambient conditions in the environment of the display device and may comprise, e.g., an ambient light sensor, an image sensor, or a video camera, or some combination thereof. A front-facing image sensor provides information regarding how much light (and, in some embodiments, what color of light) is hitting the display surface 114. This information may be used in conjunction with a model of the reflective and diffuse characteristics of the display to inform the ambient conditions model about the particular lighting conditions that the display is currently in and that the user is currently adapted to. Although optical sensor 104 is shown as a "front-facing" image sensor, i.e., facing in the general direction of the viewer 116 of the display device 102, other optical sensor types, placements, positioning, and quantities are possible. For example, one or more "back-facing" image sensors alone (or in conjunction with one or more front facing sensors) could give even further information about light sources and the color in the viewer's environment. The back-facing sensor collects light from emissive sources or re-reflected off objects behind the display, and it may be used to determine the brightness of the display's surroundings, i.e., what the user sees beyond the display. This information may also be used for the ambient conditions model. For example, the color of wall 112, if it is close enough behind display device 102 could have a profound effect on the viewer's perception. Likewise, in the example of an outdoor environment, the color and intensity of light surrounding the viewer can make the display appear different than it would an indoor environment with, e.g., incandescent (colored) lighting.

In one embodiment, the optical sensor 104 may comprise a video camera (or other devices) capable of capturing spatial information, color information, as well as intensity information. With regard to spatial information, a video camera or other device(s) may also be used to determine a viewing user's distance from the display, e.g., to further model how much of the user's field of view the display fills and, correspondingly, how much influence the display/environment will have on the user's perception of displayed content. In some embodiments, a video camera may be configured to capture images of the surrounding environment for analysis at some predetermined time interval, e.g., every two minutes, such that the ambient conditions model may be gradually updated or otherwise changed as the ambient conditions in the viewer's environment change.

Additionally, a back-facing video camera used to model the surrounding environment could be designed to have a field of view roughly consistent with the calculated or estimated field of view of the viewer of the display. Once the field of view of the viewer is calculated or estimated, e.g., based on the size or location of the viewer's facial features as recorded by a front-facing camera, assuming the native field of view of the back-facing camera is known and is larger than the field of view of the viewer, the system may then determine what portion of the back-facing camera image to use in the surround computation.

In still other embodiments, one or more cameras or depth sensors may be used to further estimate the distance of particular surfaces from the display device. This information could, e.g., be used to further inform the ambient conditions model based on the likely composition of the viewer's surround and the perceptual impacts thereof. For example, a display with a 30" diagonal sitting 18" from a user will have a greater influence on the user's vision than the same display sitting 48" away from the user, filling less of the user's field of view.

Figure 1B:
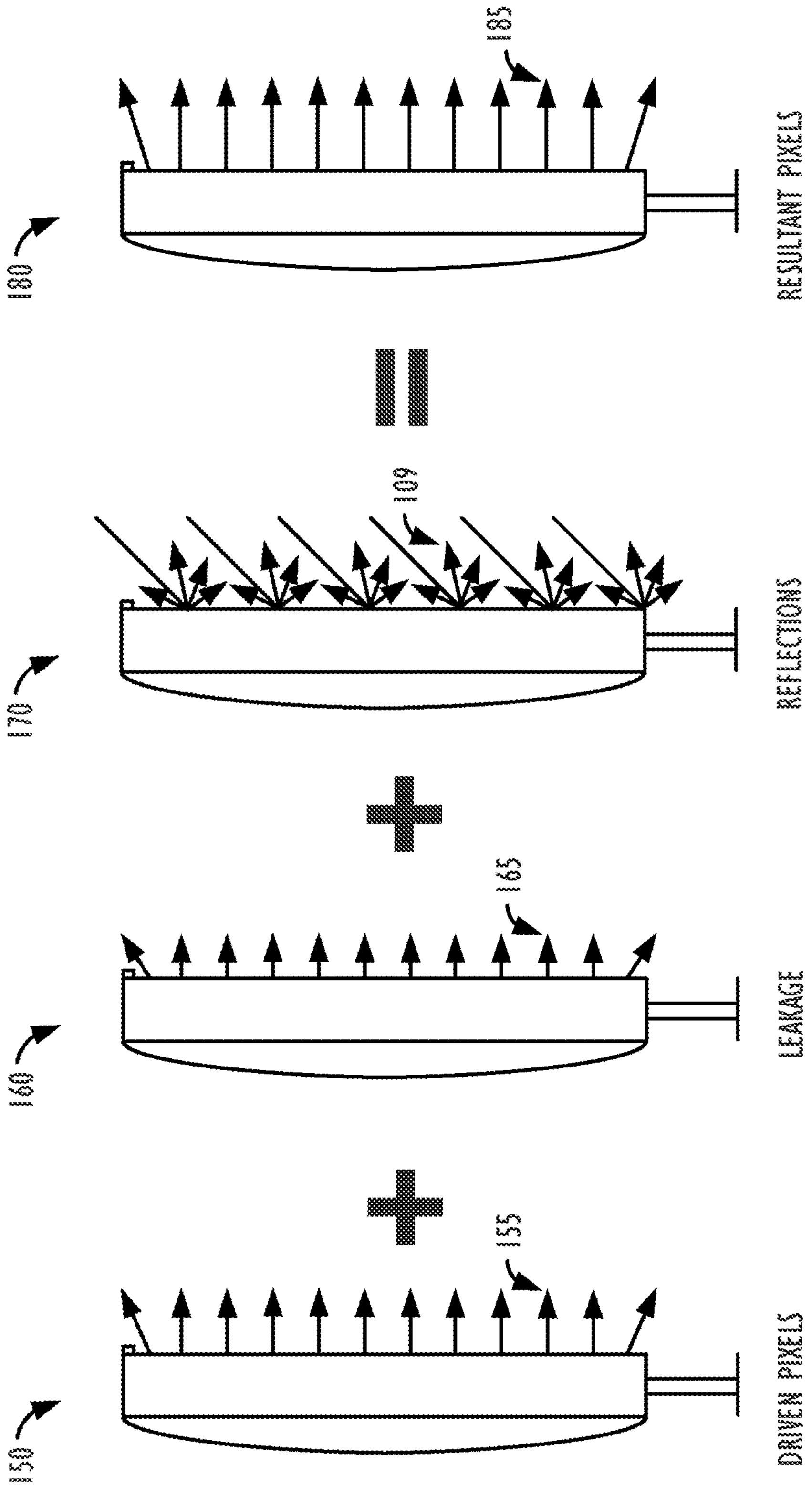
FIG. 1B illustrates the additive effects of unintended light on a display device.

Referring Now to FIG. 1B, the additive effects of unintended light on a display device are shown in more detail. For example, the light rays 155 emitting from display representation 150 represent the amount of light that the display is intentionally driving the pixels to produce at a given moment in time. Likewise, light rays 165 emitting from display representation 160 represent the amount of light leakage from the display at the given moment in time, and light rays 109 reflecting off display representation 170 represent the aforementioned diffuse reflection of ambient light rays off the surface of the display at the given moment in time. There may be more diffuse reflection off of non-glossy displays than off of glossy displays, in displays of stacked components compared to laminated components, or off of clean displays compared to dusty or otherwise dirty displays. Finally, display representation 180 represents the summation of the three forms of light illustrated in display representations 150, 160, and 170.

As illustrated in FIG. 1B, the light rays 185 emitting from display representation 180 represent the actual amount of light that perceived by a viewer of the display device, which may be different than the initial amount of light 155 pixels in the display were intentionally driven with in order to produce the desired content. The unintended light from display leakage, diffuse reflections, and the like may desaturate perceived colors compared to the content's intended color. The darker or dimmer the intended color is, the more pronounced the desaturation appears to a viewer. Thus, accounting for the effects of these various phenomenon may help to achieve a more consistent and content-accurate perceptual experience across viewing environments.

Thus, in one or more embodiments disclosed herein, an ambient conditions model may be employed as part of a unified display model for dynamically selecting which environmental adaptations to perform or adjusting environmental adaptations already being performed may compensate for unintended light, such that the dimmest colors are not masked by light leakage and/or the predicted diffuse reflection levels and all the colors are not perceived as desaturated compared to the intended colors. A model of the display device characteristics may be used to determine an amount of light leakage from the display device under the current display parameters. The model of the display device characteristics may also be used in combination with information from ambient light sensor 104 to estimate an amount of diffuse reflection off the display device. A perceptual model may be used to estimate an amount of desaturation from unintended light, such that the ambient conditions model may determine a recommended resaturation and environmental adaptations to achieve the recommended resaturation.

Background on System Gamma and Perceived Gamma for Exemplary Display Devices

Figure 2:
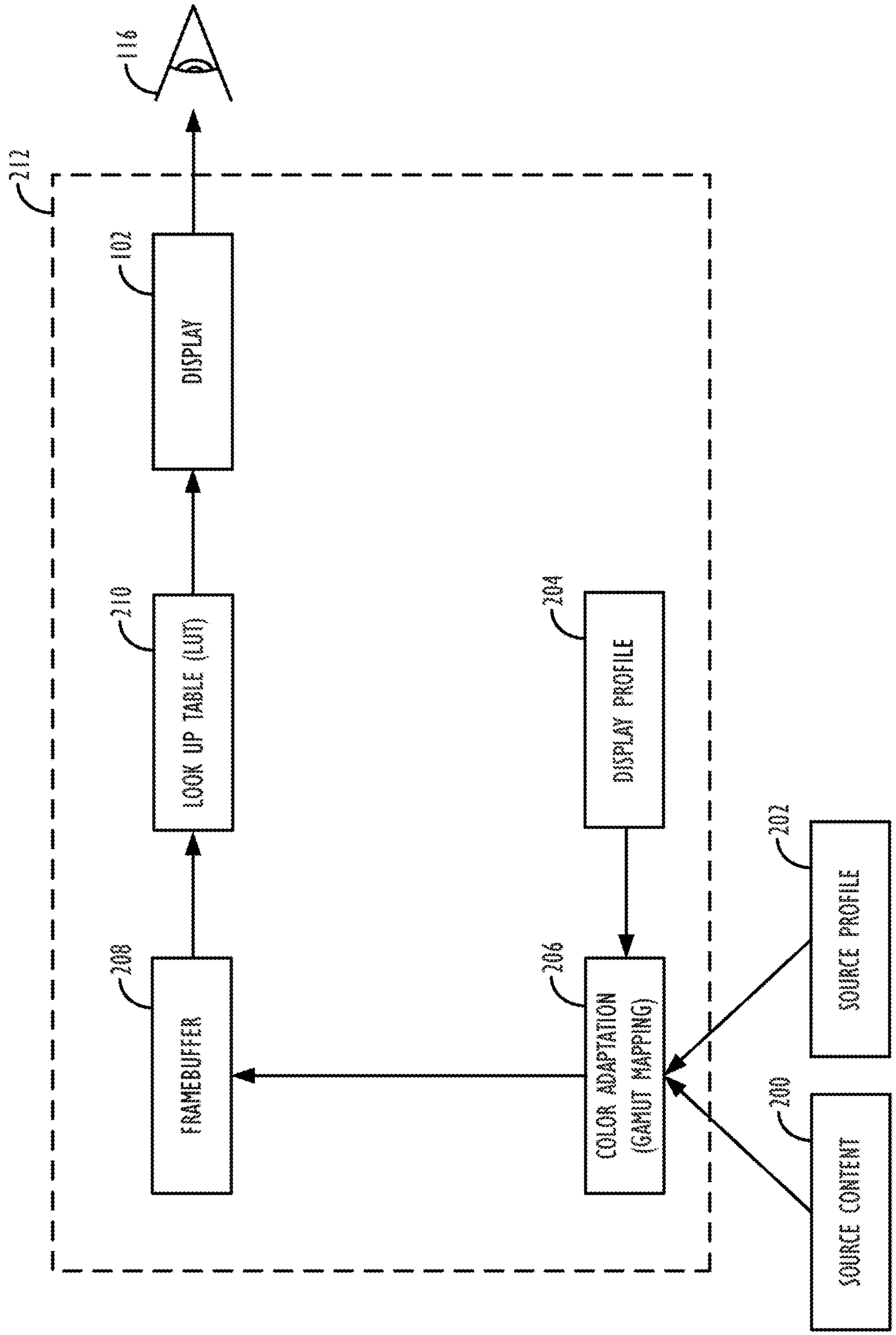
FIG. 2 illustrates a system for performing gamma adjustment utilizing a look up table.

Referring now to FIG. 2, a typical system 212 for performing gamma adjustment utilizing a Look Up Table (LUT) 210 is shown. Element 200 represents the source content, created by, e.g., a source content author, that viewer 116 wishes to view. Source content 200 may comprise an image, video, or other displayable content type. Element 202 represents the source profile, that is, information describing the color profile and display characteristics of the device on which source content 200 was authored by the source content author. Source profile 202 may comprise, e.g., an International Color Consortium (ICC) profile of the author's device or color space (which will be described in further detail below), or other related information.

Information relating to the source content 200 and source profile 202 may be sent to viewer 116's device containing the system 212 for performing gamma adjustment utilizing a LUT 210. Viewer 116's device may comprise, for example, a mobile phone, PDA, HMD, monitor, television, or a laptop, desktop, or tablet computer, or the like. Upon receiving the source content 200 and source profile 202, system 212 may perform a color adaptation process 206 on the received data, e.g., for performing gamut mapping, i.e., color matching across various color spaces. For instance, gamut matching tries to preserve (as closely as possible) the relative relationships between colors (e.g., as authored/approved by the content author on the display described by the source ICC profile), even if all the colors must be systematically changed or adapted in order to get them to display on the destination device.

Once the color profiles of the source and destination have been appropriately adapted, image values may enter the so-called "framebuffer" 208. In some embodiments, image values, e.g., pixel luma values, enter the framebuffer having come from an application or applications that have already processed the image values to be encoded with a specific implicit gamma. A framebuffer may be defined as a video output device that drives a video display from a memory buffer containing a complete frame of, in this case, image data. The implicit gamma of the values entering the framebuffer can be visualized by looking at the "Framebuffer Gamma Function," as will be explained further below in relation to FIG. 3. Ideally, this Framebuffer Gamma Function is the exact inverse of the display device's "Native Display Response" function, which characterizes the luminance response of the display to input.

Because the inverse of the Native Display Response isn't always exactly the inverse of the framebuffer, a LUT, sometimes stored on a video card or in other memory, may be used to account for the imperfections in the relationship between the encoding gamma and decoding gamma values, as well as the display's particular luminance response characteristics. Thus, if necessary, system 212 may then utilize LUT 210 to perform a so-called "gamma adjustment process." LUT 210 may comprise a two-column table of positive, real values spanning a particular range, e.g., from zero to one. The first column values may correspond to an input image value, whereas the second column value in the corresponding row of the LUT 210 may correspond to an output image value that the input image value will be "transformed" into before being ultimately being displayed on display 102. LUT 210 may be used to account for the imperfections in the display 102's luminance response curve, also known as the "display transfer function." In other embodiments, a LUT may have separate channels for each primary color in a color space, e.g., a LUT may have Red, Green, and Blue channels in the sRGB color space.

The transformation applied by the LUT to the incoming framebuffer data before the data is output to the display device may be used to ensure that a desired 1.0 gamma boost is applied to the eventual display device. The system shown in FIG. 2 is generally a good system, although it does not take into account the effect of differences or changes in ambient light conditions on the perceived gamma, or gamma adjustments already encoded in the source content 200 by the source author to compensate for differences between the source content capture environment and the source content 200's intended viewing environment. In other words, the 1.0 gamma boost for encoding and decoding content is only achieved/appropriate in one ambient lighting environment, and this environment is typically brighter than a normal office environment. For example, content captured in a bright environment won't require a gamma boost, e.g., due to the "simultaneous contrast" phenomenon, if viewed in the identical (i.e., bright) environment. For another example, content captured and edited in a bright environment but intended for viewing in a dim environment (e.g., a dark surround, such as a movie theater) may already include gamma adjustments in the source content 200 received by system 212. Additional gamma boost based on LUT 210 may thus distort the gamma adjustments already provided in the source content 200 and cause the displayed content to differ from the source author's intent.

As mentioned above, in some embodiments, the goal of this gamma adjustment system 212 is to have an overall 1.0 system gamma applied to the content that is being displayed on the display device 102. An overall 1.0 system gamma corresponds to a linear relationship between the input encoded luma values and the output luminance on the display device 102. Ideally, an overall 1.0 system gamma will cause the displayed content to appear largely as the source author intended, despite the intervening encoding and decoding of the content, and other color management processes used to adapt the content to the particular display device 102. However, as will be described later, this overall 1.0 gamma may only be properly perceived in one particular set one set of ambient lighting conditions, thus necessitating the need for a dynamic display adjustment system to accommodate different ambient lighting conditions and adjust the overall system gamma to achieve a perceived system gamma of 1.0. Further, gamma adjustment is only one kind of correction for environmental conditions, and environmental adaptations described herein include gamma adjustment as well as resaturation, black point and white point adjustment, and the like.

Figure 3:
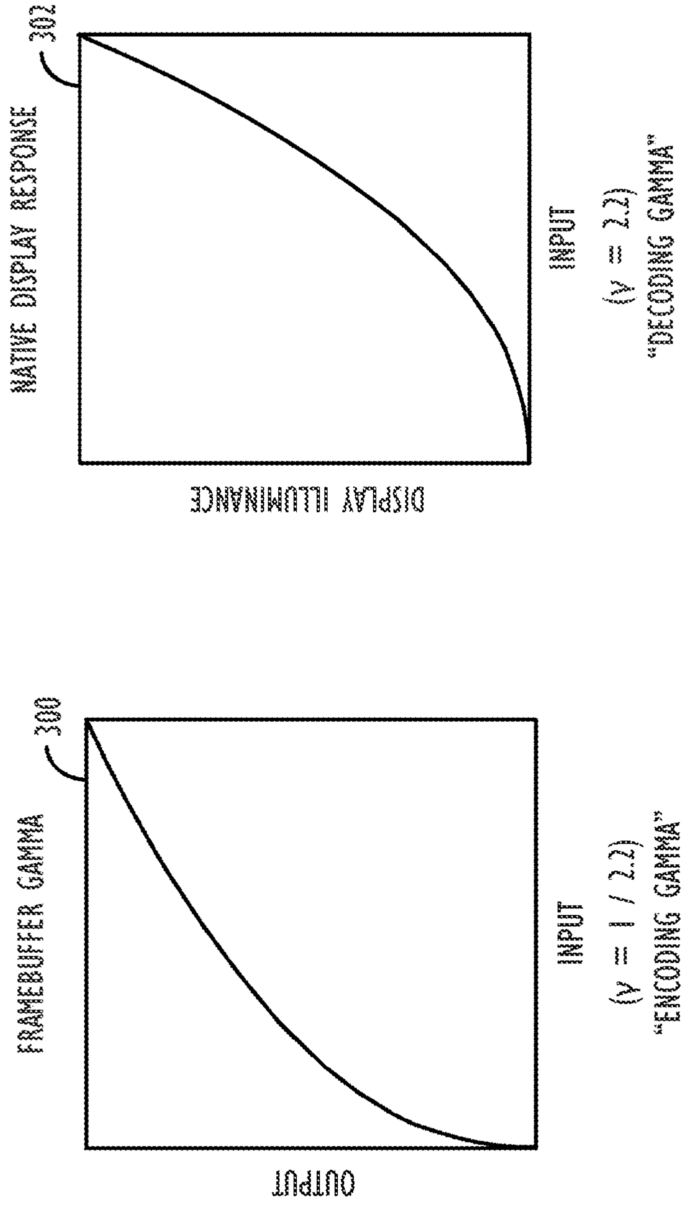
FIG. 3 illustrates a Framebuffer Gamma Function and an exemplary Native Display Response.

Referring now to FIG. 3, a Framebuffer Gamma Function 300 and an exemplary Native Display Response 302 is shown. Gamma adjustment, or, as it is often simply referred to, "gamma," is the name given to the nonlinear operation commonly used to encode luma values and decode luminance values in video or still image systems. Gamma, γ, may be defined by the following simple power-law expression: $L_{out}=L_{in}^{\gamma}$, where the input and output values, $L_{in}$ and $L_{out}$, respectively, are non-negative real values, typically in a predetermined range, e.g., zero to one. A gamma value greater than one is sometimes called an "encoding gamma," and the process of encoding with this compressive power-law nonlinearity is called "gamma compression;" conversely, a gamma value less than one is sometimes called a "decoding gamma," and the application of the expansive power-law nonlinearity is called "gamma expansion." Gamma encoding of content helps to map the content data into a more perceptually-uniform domain.

Another way to think about the gamma characteristic of a system is as a power-law relationship that approximates the relationship between the encoded luma in the system and the actual desired image luminance on whatever the eventual user display device is. In existing systems, a computer processor or other suitable programmable control device may perform gamma adjustment computations for a particular display device it is in communication with based on the native luminance response of the display device, the color gamut of the device, and the device's white point (which information may be stored in an ICC profile), as well as the ICC color profile and other content indicators that the source content's author attached to the content to specify the content's "rendering intent." The ICC profile is a set of data that characterizes a color input or output device, or a color space, according to standards promulgated by the International Color Consortium. ICC profiles may describe the color attributes of a particular device or viewing requirement by defining a mapping between the device source or target color space and a profile connection space (PCS), usually the CIE XYZ color space. ICC profiles may be used to define a color space generically in terms of three main pieces: 1) the color primaries that define the gamut; 2) the transfer function (sometimes referred to as the gamma function); and 3) the white point. ICC profiles may also contain additional information to provide mapping between a display's actual response and its "advertised" response, i.e., its tone response curve (TRC), for instance, to correct or calibrate a given display to a perfect 2.2 gamma response.

In some implementations, the ultimate goal of the gamma adjustment process is to have an eventual overall 1.0 gamma boost, i.e., so-called "unity" or "no boost," applied to the content as it is displayed on the display device. An overall 1.0 system gamma corresponds to a linear relationship between the input encoded luma values and the output luminance on the display device, meaning there is actually no amount of gamma "boosting" being applied, and the gamma encoding process is undone by the gamma decoding process, without further adjustment.

Classically, a gamma encoding is optimized for a particular environment, dynamic range of content, and dynamic range of display, such that the encoding and display codes are well-spaced across the intended range and the content appears as intended (e.g., not banded, without crushed highlights or blacks, and with correct contrast—sometimes called tonality, etc.). 8-bit 2.2 gamma is an example of an acceptable representation for encoding SDR (standard dynamic range) content to be displayed on a 1/2.45 gamma Rec.709 CRT in a bright-office viewing environment.

However, the example SDR content will not have the intended appearance when viewed in an environment that is brighter or dimmer than the intended, bright-office viewing environment, even when displayed on its intended Rec.709 display. When the current viewing environment differs from the suggested viewing environment, for instance, if it is brighter than the suggested viewing environment, the user's vision adapts to the current, brighter viewing environment, such that the user perceives fewer distinguishable details in the darker portions of the content. The display may only be able to modulate a small range of the user's vision as adapted to the current, brighter viewing environment. Further, the display's fixed maximum brightness may be dim compared to the brightness of the current viewing environment.

The current, brighter viewing environment prevents the user from perceiving the darker portions in the content that the source author intended the viewer to perceive when the content is viewed on the suggested Rec.709 display in the suggested, bright-office viewing environment. In other words, "shadow detail" is "crushed" to black. This effect is magnified when ambient light from the viewing environment is reflected off the display and/or light from display leakage, collectively called unintended light, further limit how dark the content is perceived by the viewer. The lowest codes in the content are spaced apart in brightness based on the suggested viewing environment and may be too closely spaced to be differentiable in the current, brighter viewing environment.

The perceived, overall tonality of the content differs when the current viewing environment differs from the suggested viewing environment as well. For example, the content may appear lower in contrast when the current viewing environment is brighter than the suggested viewing environment. The content may also appear desaturated, with an unintended color cast, due to unintended light from reflections off the display and/or display leakage, or when the white point of the suggested viewing environment differs from the white point of the current viewing environment.

Even when viewed on the suggested Rec.709 display in the suggested, bright-office viewing environment, the tonality of the content may be perceived differently based on what other content is displayed at the same time, in an effect referred to as "simultaneous contrast." Some devices display multiple content items at a time, for example, a user's work computer may display multiple documents and a video at the same time. The different content items may be tailored for different suggested viewing environments, such that each content item uses a different gamma encoding and/or a different gamma boost. Display devices that implement the same gamma boost to all the content items may end up distorting the individual content items away from their intended appearances.

For instance, Rec.709 content has an overall 1.22 gamma boost from the intentional mismatch between the content's encoding gamma and the display's decoding gamma, to compensate for bright-surround content being viewed in a dim-surround environment. In contrast, DCI P3 content directly encodes the compensation for bright-surround content being viewed in a dim-surround environment into the pixels themselves, such that no gamma boost is needed, that is, a 1.0 gamma is sufficient. No single gamma boost is appropriate for both the Rec.709 content and the DCI P3 content in any viewing environment. While this example describes differences in gamma boost, similar differences may be found in other kinds of content adaptation, such as tone mapping, re-saturation, black point and/or white point adjustments, modified transfer functions for the display, and combinations thereof. As used herein, "surround environment" refers to ambient lighting conditions and the like in the environment around the display device. A "viewing environment" refers to the surround environment around the display device and display characteristics, such as display device light leakage, that may further influence how a user perceives content displayed on the display device.

Returning now to FIG. 3, the x-axis of Framebuffer Gamma Function 300 represents input image values spanning a particular range, e.g., from zero to one. The y-axis of Framebuffer Gamma Function 300 represents output image values spanning a particular range, e.g., from zero to one. As mentioned above, in some embodiments, image values may enter the framebuffer 208 already having been processed and have a specific implicit gamma. As shown in graph 300 in FIG. 3, the encoding gamma is roughly 1/2.2, or 0.45. That is, the line in graph 300 roughly looks like the function, $L_{OUT}=L_{IN}^{0.45}$. Gamma values around 1/2.2, or 0.45, are typically used as encoding gammas because the native display response of many display devices have a gamma of roughly 2.2, that is, the inverse of an encoding gamma of 1/2.2. In other cases, a gamma of, e.g., 1/2.45, may be applied to 1.96 gamma encoded content when displayed on a conventional 1/2.45 gamma CRT display, in order to provide the 1.25 gamma "boost" (i.e., 2.45 divided by 1.96), required to compensate for the simultaneous contrast effect causing bright content to appear low-contrast when viewed in a dim surround environment (i.e., the area beyond the display is typically more dim), such as the 16 lux Rec.709 intended viewing environment. If the content already includes additional gamma boost because the source author intended the bright content to be viewed in a dim surround environment and framebuffer 208 does not account for this encoded gamma boost, the resulting gamma boost will differ from the source author's rendering intent.

The x-axis of Native Display Response Function 302 represents input image values spanning a particular range, e.g., from zero to one. The y-axis of Native Display Response Function 302 represents output image values spanning a particular range, e.g., from zero to one. In theory, systems in which the decoding gamma is the inverse of the encoding gamma should produce the desired overall 1.0 system gamma. However, this fails to account for ambient light in the environment around the display device and/or the gamma boost already encoded into the source content. Thus, the desired overall 1.0 system gamma is only achieved in one ambient lighting environment, e.g., the authoring lighting environment or, where gamma boost is already encoded into the source content, in the intended viewing environment. These systems do not dynamically adapt to environmental conditions surrounding the display device, or according to user preferences.

Figure 4:
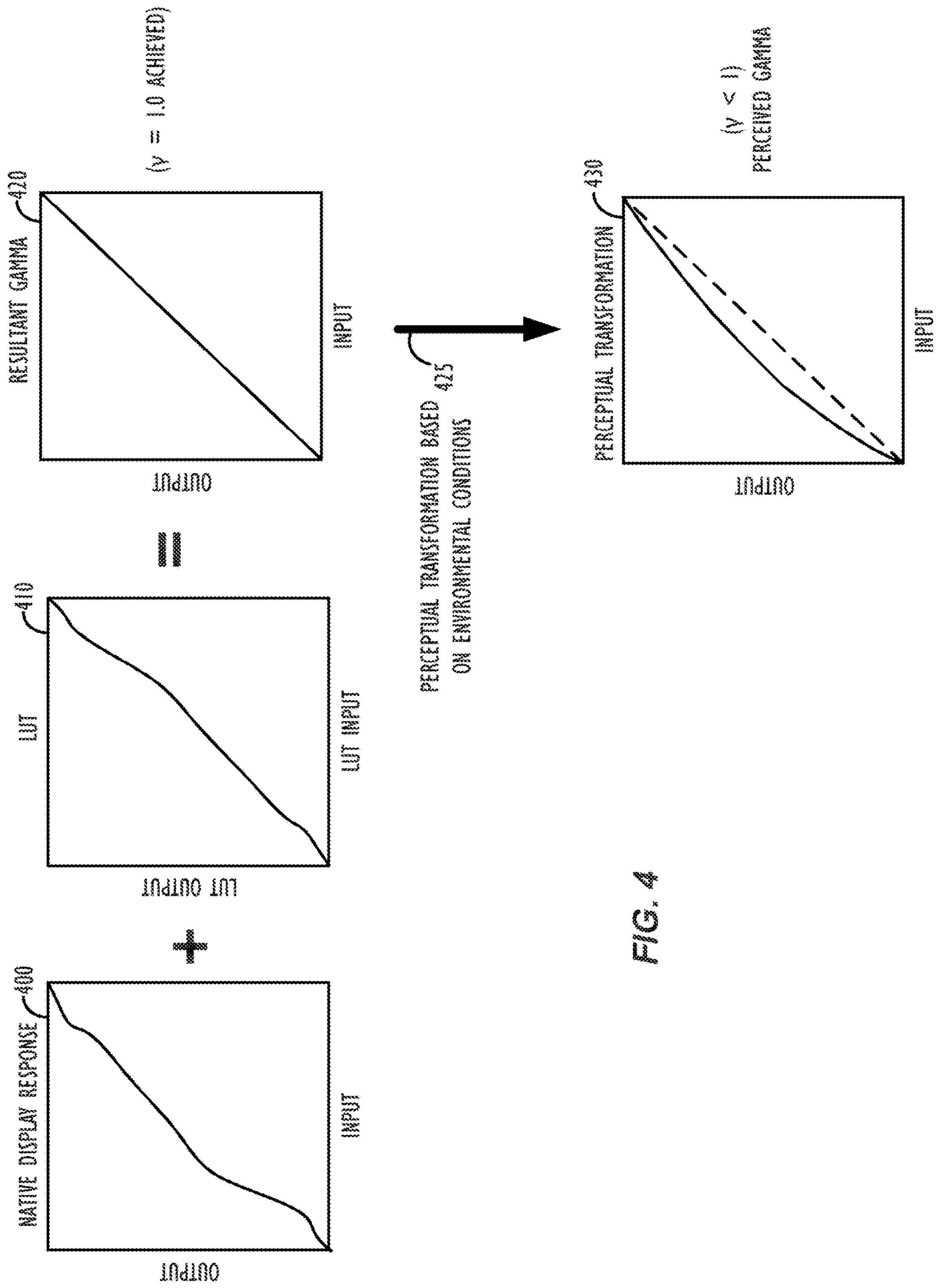
FIG. 4 illustrates graphs representative of a LUT transformation and a Resultant Gamma Function, as well as a graph indicative of a perceptual transformation due to environmental conditions.

Referring now to FIG. 4, graphs representative of a LUT transformation and a Resultant Gamma Function are shown, as well as a graph indicative of a perceptual transformation due to environmental conditions. The graphs in FIG. 4 show how, in an ideal system, a LUT may be utilized to account for the imperfections in the relationship between the encoding gamma and decoding gamma values, as well as the display's particular luminance response characteristics at different input levels. The graphs in FIG. 4 also illustrate how the environmental conditions surrounding the display device may then distort perception of the content such that the perceived gamma differs from the Resultant Gamma Function. The x-axis of native display response graph 400 represents input image values spanning a particular range, e.g., from zero to one. The y-axis of native display response graph 400 represents output image values spanning a particular range, e.g., from zero to one. The non-straight line nature of graph 400 represents the minor peculiarities and imperfections in the exemplary display's native response function. The x-axis of LUT graph 410 represents input image values spanning the same range of input values the display is capable of responding to, e.g., from zero to one. The y-axis of LUT graph 410 represents the same range of output image values the display is capable of producing, e.g., from zero to one. In an ideally-calibrated display device, the display response 400 will be the inverse of the LUT response 410, such that, when the LUT graph is applied to the input image data, the Resultant Gamma Function 420 reflects a desired overall system 1.0 gamma response, i.e., resulting from the adjustment provided by the LUT and the native (nearly) linear response of the display, and the content is perceived as the source author intended. The x-axis of Resultant Gamma Function 420 represents input image values as authored by the source content author spanning a particular range, e.g., from zero to one. The y-axis of Resultant Gamma Function 420 represents output image values displayed on the resultant display spanning a particular range, e.g., from zero to one. The slope of 1.0, reflected in the line in graph 420, indicates that luminance levels intended by the source content author will be reproduced at corresponding luminance levels on the ultimate display device.

Ideally, the Resultant Gamma Function 420 reflects a desired overall 1.0 system gamma on the resultant display device, indicating that the tone response curves (i.e., gamma) are matched between the source and the display, that the gamma encoding of the content has been undone by the gamma decoding process without further adjustment, and that the image on the display is likely being displayed more or less as the source's author intended. However, this calculated overall 1.0 system gamma does not take into account the effect of ambient lighting conditions on the viewer's perception of the gamma boost. In other words, due to perceptual transformations caused by ambient conditions in the viewer's environment 425, the viewer does not perceive the content as the source author intended and does not perceive an overall 1.0 gamma in all lighting conditions. The calculated overall 1.0 gamma may further fail to take into account the effect on the viewer's current adaptation to the ambient light conditions. As described above, a user's ability to perceive changes in light intensity (as well as the overall range of light intensities that their eyes may be able to perceive) is further based on what levels of light the user's eyes have been around (and thus adjusted to) over a preceding window of time (e.g., 30 seconds, 5 minutes, 15 minutes, etc.) The calculated overall 1.0 gamma may also fail to take into account a gamma boost already encoded into the source content by the source author based on the source capture and editing environments and the intended viewing environment. For example, a video may be filmed in a bright environment but have been edited for viewing in a dim environment, with a gamma boost matching this transition already encoded into the video. If a system tries to further adjust the already adjusted gamma boost, the resultant gamma differs from the source author's rendering intent.

As is shown in graph 430, the dashed line indicates a perceived 1.0 gamma boost, i.e., the viewer's actual perception of the achieved system gamma, which corresponds to an overall gamma boost that is greater than 1.0. The ambient conditions in the viewing surround transformed the achieved system gamma of greater than 1.0 into a perceived system gamma of equal to 1.0. Thus, a unified display model for dynamically adjusting a display's characteristics according to one or more embodiments disclosed herein may be able to account for the perceptual transformation due to the viewer's current environmental conditions, cause the display to boost the achieved system gamma above the intended 1.0 system gamma, and thus present the viewer with what he or she will perceive as an overall 1.0 system gamma, causing the content to be perceived as the source author intended. As explained in more detail below, such unified display models may also have a non-uniform time constant for how stimuli affect the viewer's instantaneous adaptation over time. In other words, the model may attempt to predict changes in a user's perception due to changes in the viewer's ambient conditions.

A Unified Display Model Utilizing Dynamic System OOTF

Figure 5:
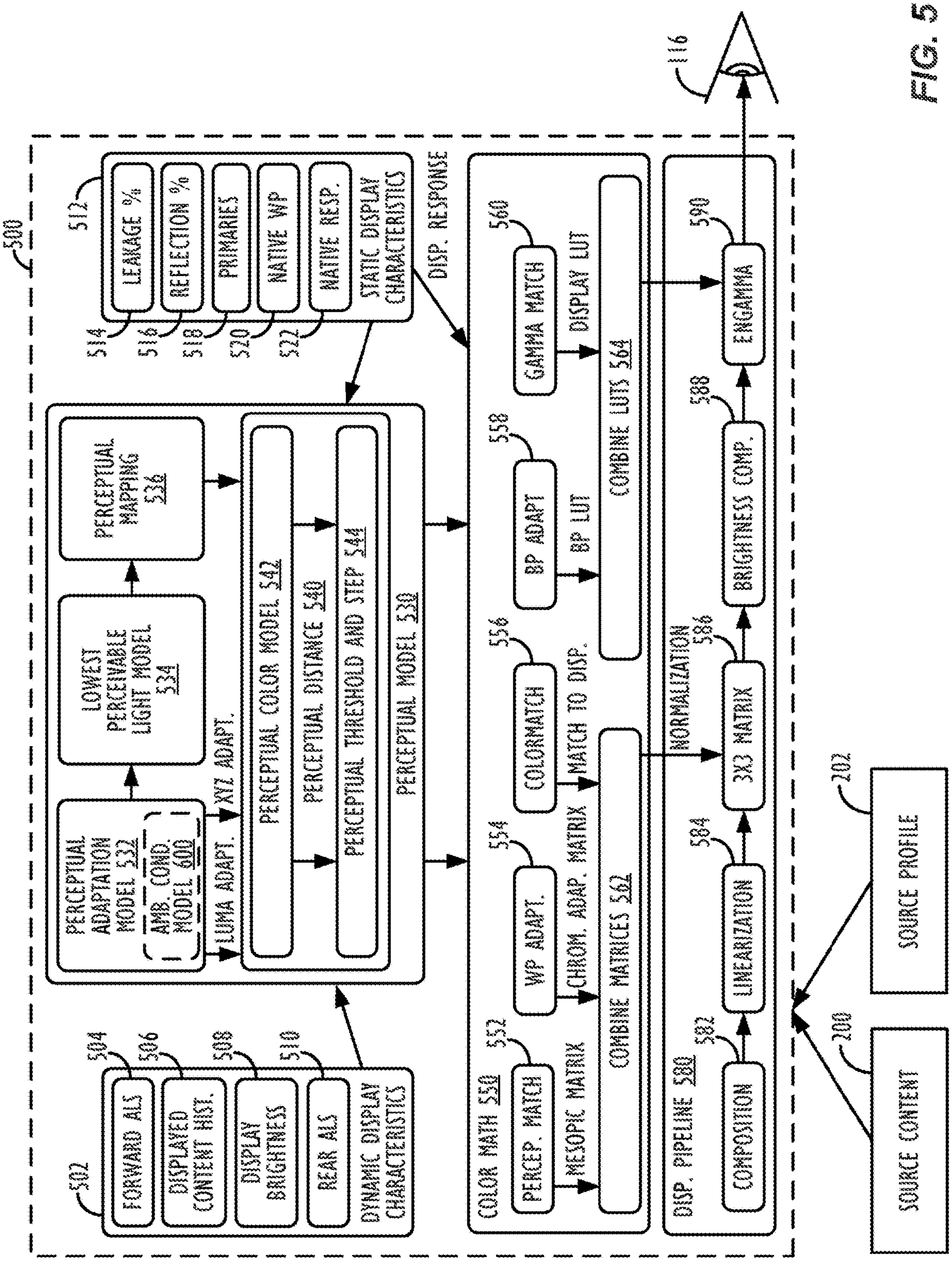
FIG. 5 illustrates a unified display model system for performing display adjustment based on a dynamic system OOTF, in accordance with one or more embodiments.

Referring now to FIG. 5, a unified display model system 500 for performing display adjustment based on a dynamic system OOTF is illustrated, in accordance with one or more embodiments. A given display, e.g., display 102, may be said to have the capability to "modulate" (that is, adapt or adjust to) only a certain percentage of possible surround environments at any given moment in time. For instance, if the environment is much brighter than the display, such that the display is reflecting a lot of light at its minimum display output level, then the display may have a relatively high "pedestal" value, and thus, even at its maximum display output level, only be able to modulate a fraction of the ambient lighting conditions.

Unified display model system 500 may thus be used to apply a transformation(s) for warping the source content 200 (e.g., high precision source content) into the viewer's adapted visual perception of display 102 in a given viewing environment. As described above, warping the original source content signal to the perception of the viewer of the display and the display's environment may be based, e.g., on the predicted viewing environment conditions received an ambient conditions model, as will be described further with reference to FIG. 6. For example, the ratio of display 102's diffuse white brightness in nits to the brightness of the user's view beyond display 102, called the surround, also in nits may be used to apply a gamma boost, color saturation correction, or similar algorithm to compensate for the perceptual effect of viewing content in a surround with a different brightness than the surround associated with source content 200 during capture, editing, or approval.

According to some embodiments, the unified display model system 500 may consider one or more dynamic display characteristics 502, such as: information obtained from forward-facing ambient light sensors (ALS) 504; information obtained from rear-facing ALS 510; histogram information for the currently-displayed content 506; and/or the display device's current overall brightness level 508.

According to some embodiments, unified display model system 500 may also consider one or more static display characteristics 512 when determining how to modify displayed content, such as: information regarding the percentage of light leakage experienced by the display 514; information regarding the percentage of light reflection of the surface of the display 516; information regarding the display device's color primaries 518; information regarding the display device's native white point 520; and/or information regarding the display device's native response 522.

According to some embodiments, the unified display model system 500 may combine information from both the dynamic display characteristics 502 and static display characteristics 512 in a perceptual model 530. According to some such embodiments, the perceptual model 530 may comprise a perceptual visual adaptation model 532 configured to model a viewer's likely adaptation level, given the current dynamic display characteristics 502 and static display characteristics 512. In some embodiments, the perceptual visual adaptation model 532 may be based, at least in part, on a color appearance model (CAM), such as the CIECAM02 color appearance model, and may be used to further inform an ambient conditions model 600 regarding the appropriate amount of gamma boost to apply with the display's modified transfer function. The CAM may, e.g., be based on the brightness and white point of the viewer's surround, as well as the field of view of the display subtended by the viewer's field of vision.

In some embodiments, knowledge of the size of the display and the distance between the display and the viewer may also serve as useful inputs to the unified display model 500. Information about the distance between the display and the user could be retrieved from a front-facing image sensor, such as front-facing camera 104. For example, the brightness and white point of the viewer's surround may be used to determine a ratio of diffuse white brightness to the viewing surround brightness. Based on the determined ratio, a particular gamma boost may be applied. For example, for pitch black ambient environments, an additional gamma boost of about 1.5 imposed by the LUT may be appropriate, whereas a 1.0 gamma boost (i.e., unity, or no boost) may be appropriate for a bright or sun-lit environment. For intermediate surrounds, appropriate gamma boost values to be imposed by the LUT may be interpolated between the values of 1.0 and about 1.5. A more detailed model of surround conditions is provided by the CIECAM02 specification.

According to some embodiments, the perceptual visual adaptation model 532 may also be used to predict a current lowest perceivable light level for the viewer using model 534 as well as to perceptually map the display and the environment to the viewer's current perception using model 536. Using this information, and optionally after adapting the luma and/or chroma display data to an XYZ color space (or another device-invariant color space) a perceptual distance model 540 may employ a perceptual color model 542 (e.g., based on the CIELAB color space) to determine, at block 544, a perceptual threshold below which the viewer may not currently be able to perceive changes in tonality and/or the steps (i.e., changes) needed to modify the display's response based on the viewer's predicted perceptual adaptation level under the current viewing conditions.

The output of perceptual model 530 may then be transmitted to a color math model 550 that is used to calculate and configure the modifications to the display's response to achieve the desired perceptual reference. According to some embodiments, color math model 550 may comprise: a module 552 for matching the displayed content values to the viewer's current color perception; a module 554 for performing white point adaptation; a module 556 for performing color matching to the display device's color gamut; a module 558 for performing white point adaptation; and/or a module 560 for calculating a gamma matching response for the display device. The output of modules 552/554/556/558/560 may be combined into one more matrices 562, e.g., a mesopic matrix, chromatic adaptation matrix, etc., and/or one or more combined look up tables (LUTs) 564 to efficiently store the values embodying the changes determined by the color math model 550 to be applied to the display device. The aforementioned matrices 562 and/or LUTs 564 may then be normalized and passed to a display pipeline 580.

Display pipeline 580 may perform one or more functions of: compositing multiple content items for simultaneous display 582; linearizing content item color data 584; applying the color changes as determined by the color math model 550, e.g., via the application of one or more 3×3 matrices 586; performing any necessary brightness compensation 588 as determined by the unified display model; and gamma encoding 590 the modified content for final display to the viewer 116.

In some embodiments, the modifications to the combined LUTs 564 may be implemented gradually (e.g., over a determined interval of time), via an animation engine or similar control element in display pipeline 580. According to some such embodiments, display pipeline 580 may be configured to adjust the combined LUTs 564 based on the rate at which it is predicted the viewer's vision will adapt to the changes.

In some embodiments, the black level for a given ambient environment is determined, e.g., by using an ambient light sensor 104 or by taking measurements of the actual panel and/or diffuser of the display device. As mentioned above in reference to FIG. 1A, diffuse reflection of ambient light off the surface of the device may add to the intended display values and affect the user's ability to perceive the darkest display levels (a phenomenon also known as "black crush"). In other environments, light levels below a certain brightness threshold will simply not be visible to the viewer. Once this level is determined, the black point may be adjusted accordingly.

In another embodiment, the white point, i.e., the color a user perceives as white for a given ambient environment, may be determined similarly, e.g., by using one or more optical sensors 104 to analyze the lighting and color conditions of the ambient environment. The white point for the display device may then be chromatically adapted to be the determined white point from the viewer's surround. Additionally, it is noted that modifications to the white point may be asymmetric between the LUT's Red, Green, and Blue channels, thereby moving the relative RGB mixture, and hence the white point.

As described above, in some embodiments, unified display model 500 may first adapt source content 200 to its reference environment using specified adaptation algorithms included in source profile 202, if necessary. For example, RGB-based gamma for Rec.709 video, as classically applied via a mismatch between content encoding gamma and display 102's decoding response may be applied. Once source content 200 is adapted to its reference environment using its specified algorithms, unified display model 500 may adapt source content 200 into a shared, system-level viewing environment, or common compositing space, using best practices. The common compositing space may be dynamically changed to match the user's current viewing environment, or it may be held constant. In implementations in which the common compositing space is held constant, unified display model 500 may globally adapt all content items in the common compositing space to adapt the fixed common compositing space to the current viewing environment. Any appropriate techniques may be used to adapt source content 200 from its reference environment to the common compositing space, and from the common compositing space to the current viewing environment. This function may be particularly useful where multiple content items from multiple source authors are to be displayed at a time. The unique content adaptations already encoded in each content item may be adjusted without influencing content adaptations applied to other content items. Then, the common compositing space for all content items may be adjusted based on the particular viewing surround for display 102. In the embodiments described immediately above, the combined LUTs 564 may serve as a useful and efficient place for unified display model system 500 to impose these environmentally-aware display transfer function adaptations. In some embodiments, the unified display model system 500 may generate an ICC profile that represents the native response of the display as the true native response of the display divided by the desired system gamma, based on the viewing surround. The ICC profile may include fixed "presets" where each preset represents a particular viewing surround and the corresponding environmental adaptations needed for content to be perceived correctly in the particular viewing surround. Unified display model 500 may then determine an appropriate preset based on analysis of the obtained ambient conditions and apply the corresponding environmental adaptations to source content 200—either directly or to the common compositing space.

Figure 6:
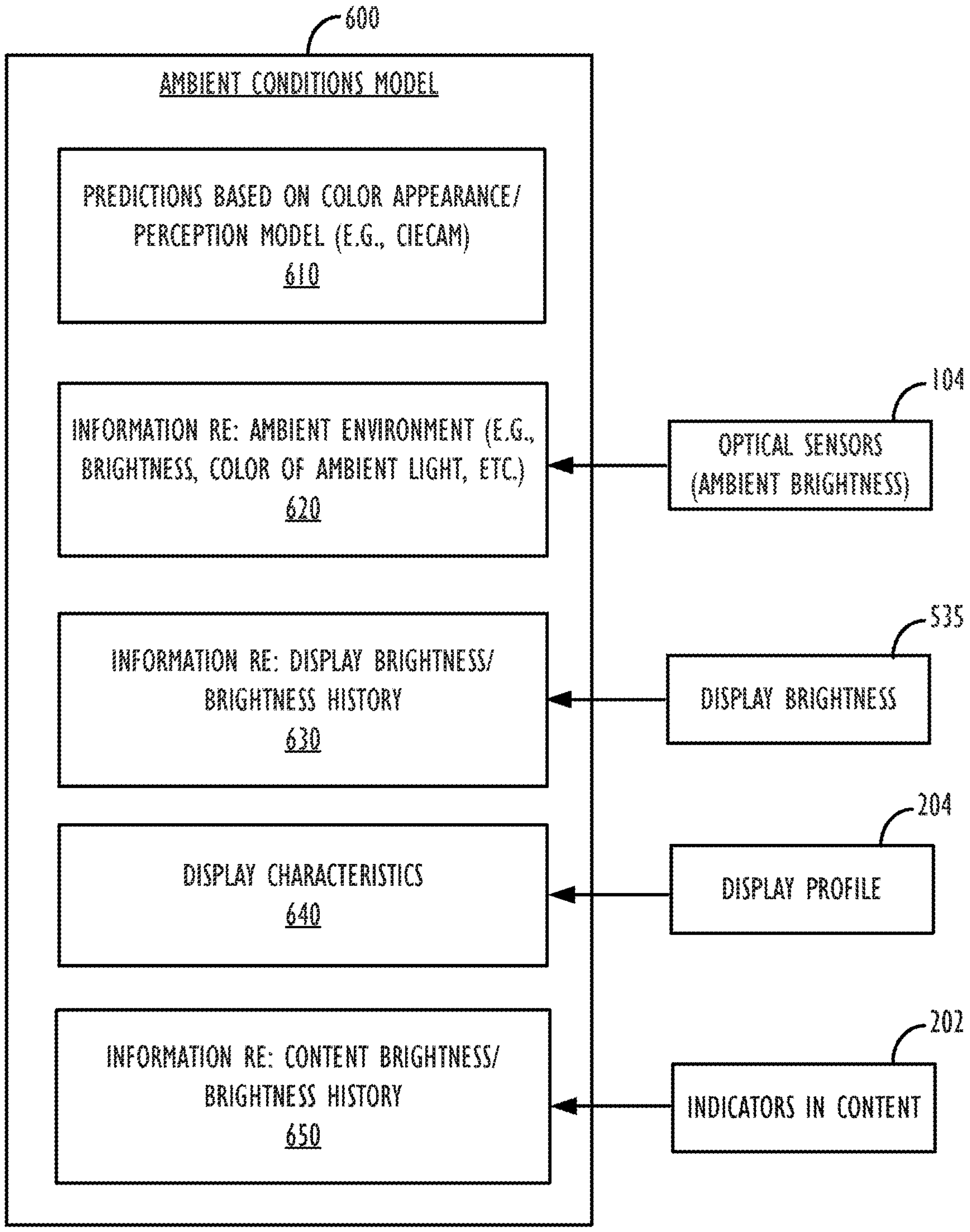
FIG. 6 illustrates a simplified functional block diagram of an ambient conditions model, in accordance with one or more embodiments.

Referring now to FIG. 6, a simplified functional block diagram of an example ambient conditions model 600 is shown. As alluded to above, the ambient conditions model 600 may consider various factors, e.g.: predictions from a color appearance/perception model 610; information regarding the ambient environment, e.g., from ambient light sensor (s)/image sensor(s) 620; information regarding the display's current brightness level and/or brightness history 630 (e.g., knowing how bright the display has been and for how long may influence the user's adaptation level); information and characteristics from the display device's profile 640; and/or information based on historically displayed content/predictions based on upcoming content 650.

Color appearance model 610 may comprise, e.g., the CIECAM02 color appearance model or the CIECAM97s model. Color appearance models may be used to perform chromatic adaptation transforms and/or for calculating mathematical correlates for the six technically defined dimensions of color appearance: brightness (luminance), lightness, colorfulness, chroma, saturation, and hue.

Display characteristics 640 may comprise information from display profile 204 regarding the display device's color space, native display response characteristics or abnormalities, reflectiveness, leakage, or even the type of screen surface used by the display. For example, an "anti-glare" display with a diffuser will "lose" many more black levels at a given (non-zero) ambient light level than a glossy display will.

Historical model 650 may take into account both the instantaneous brightness levels of content and the cumulative brightness of content over a period of time. In other embodiments, the model 650 may also perform an analysis of upcoming content, e.g., to allow the ambient conditions model to begin to adjust a display's transfer function over time, such that it is in a desired state by the time (or within a threshold amount of time) that the upcoming content is displayed to the viewer. The biological/chemical speeds of visual adaptation in humans may also be considered when the ambient conditions model 600 determines how quickly to adjust the display to account for the upcoming content. In some cases, content may itself already be adaptively encoded, e.g., by the source content creator. For example, one or more frames of the content may include a customized transfer function associated with respective frame or frames. In some embodiments, the customized transfer function for a given frame may be based only on the given frame's content, e.g., a brightness level of the given frame. In other embodiments, the customized transfer function for a given frame may be based, at least in part, on at least one of: a brightness level of one or more frames displayed prior to the one or more frames of content; and/or a brightness level of one or more frames displayed after the one or more frames of content. In cases where the content itself has been adaptively encoded, the ambient conditions model 600 may first implement the adaptively encoded adjustments, moving the content into a common compositing space according to content indicators included in source profile 202. Then, ambient conditions model 600 may attempt to further modify the display's transfer function during the display of particular frames of the encoded content, e.g., based on the other various environment factors, e.g., 610/620/630/640, that may have been obtained at the display device.

According to some embodiments, modifications determined by the ambient conditions model 600 may be implemented by changing existing table values (e.g., as stored in one or more calibration LUTs, i.e., tables configured to give the display a 'perfectly' responding tone response curve). Such changes may be performed via looking up the value for the transformed value in the original table, or by modifying the original table 'in place' via a warping technique. For example, the aforementioned black level (and/or white level) adaptation processes may implemented via a warped compression of the values in the table up from black (and/or down from white). In other embodiments, a "re-gamma"

and/or a “re-saturation” of the LUTs may be applied in response to the adjustments determined by the ambient conditions model 600.

As is to be understood, the exact manner in which ambient conditions model 600 processes information 610/620/630/640/650 received from the various sources optical sensors 104, display brightness 508, display profile 204, and indicators in content source profile 202, and how it modifies the resultant display response curve, e.g., by modifying LUT values, including how quickly such modifications take place, are up to the particular implementation and desired effects of a given system.

According to some embodiments, the ambient conditions model 600 may be used to consider the various factors described above with reference to FIG. 6 that may have an impact on the viewer's perception at the given moment in time. Then, based on the output of the ambient conditions model 600, an updated display transfer function may be determined for driving the display 102. The display transfer function may be used to convert between the input signal data values and the voltage values that can be used to drive the display to generate a pixel brightness corresponding to the perceptual bin that the transfer function has mapped the input signal data value to at the given moment in time. One goal of the ambient conditions model 600 is to: determine the viewer's current surround; determine what region of the adapted range the content and/or display is modulating; and then map to the transfer function corresponding to that portion of the adapted range, so as to optimally use the display codes (and the bits needed to enumerate them).

Figure 7:
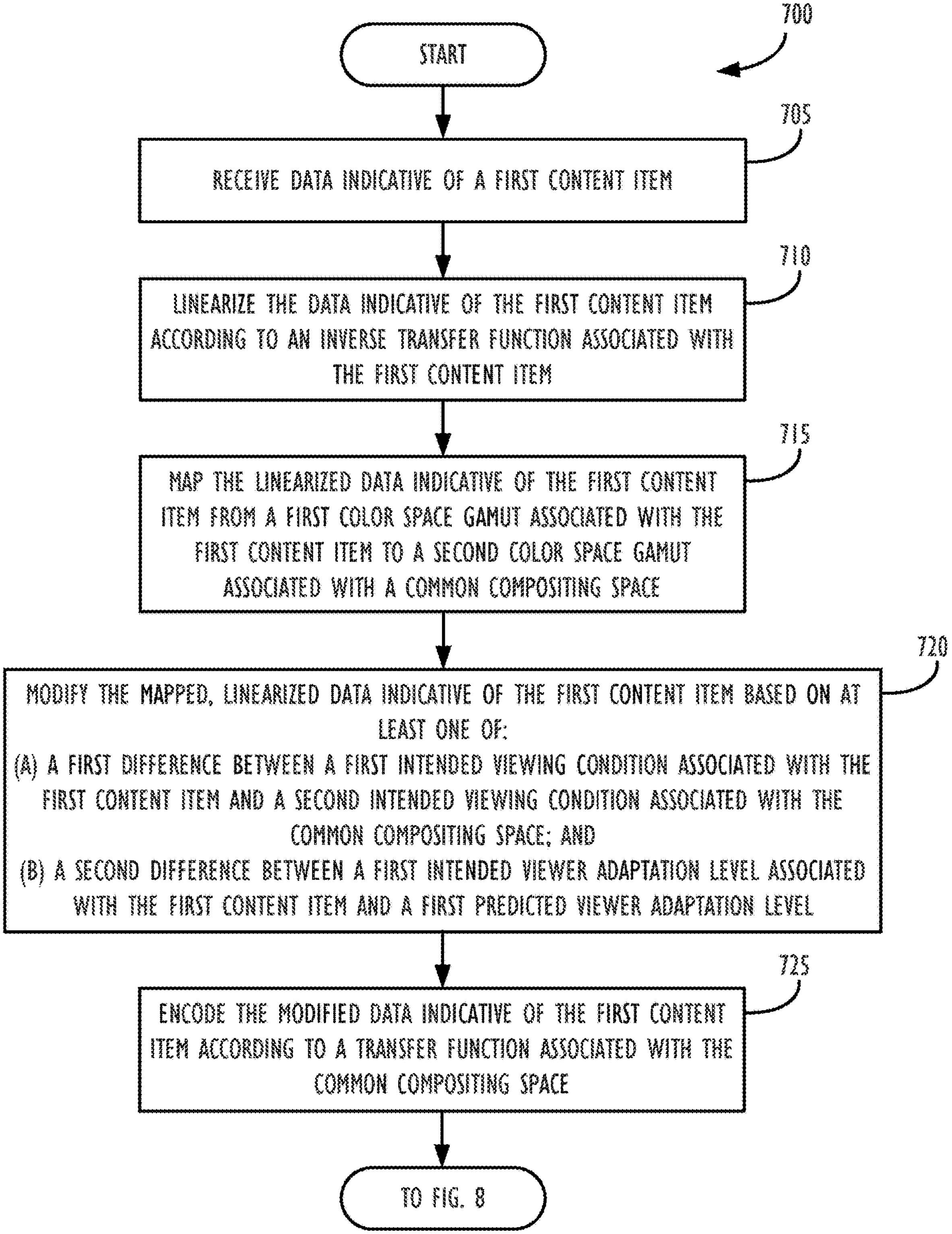
FIG. 7 illustrates, in flowchart form, a process for performing display adjustment based on a dynamic system OOTF, in accordance with one or more embodiments.

Referring now to FIG. 7, one embodiment of a process 700 for performing display adjustment based on a dynamic system OOTF is shown, in flowchart form. The overall goal of some unified display models may be to understand how the source material will be perceived by a viewer, on the viewer's display, in the viewer's surround, at a given moment in time. First, the display adjustment process may begin by receiving data indicative of a first content item (Step 705). For example, the first content item may comprise encoded display data tied to a particular source color space gamut. In some embodiments, indicators in the content may specify particular adaptation algorithms to be used to adapt the content item from the source color space to the display color space and an intended viewing environment. For example, RGB-based gamma for Rec.709 video, as classically applied, often needs to account for a mismatch between the content's encoding gamma and the display's decoding response. As another example, the video that a viewer wishes to display may have been captured in a bright surround and be intended to be viewed in a dark surround, and so it may include an appropriate gamma boost to accommodate the dark surround of the intended viewing environment. Next, the process 700 may perform a linearization process to attempt to remove the gamma encoding (Step 710). For example, if the data has been encoded with a gamma of (1/2.2), the linearization process may attempt to linearize the data by performing a gamma expansion with a gamma of 2.2. After linearization, the process will have a version of the first content item data that is approximately representative of the data as it was in the source color space. Linearization may be required to perform some operations, such as color management and scaling. In some cases, e.g., if an extended dynamic range pixel buffer format (e.g., EDR) is used, pixel brightness values may also be divided by the desired reference white brightness value before further processing. Use of an EDR format may be necessary, e.g., when SDR and HDR content are to be displayed simultaneously on the same display.

At this point, the process 700 may map the linearized data indicative of the first content item from a first color space gamut associated with the first content item to a second color space gamut associated with a common compositing space (Step 715). In one embodiment, the gamut mapping may use one or more color adaptation matrices. In other embodiments, a 3DLUT may be applied. In some embodiments, one or more pre-composition, content-specific tone mapping operations may be applied, if necessary. For example, some content may have metadata, gain maps, and/or other affordances associated directly with the content item itself.

Once the first content item is mapped to the color space gamut of the common compositing space, the mapped, linearized data indicative of the first content item may be further modified, based on at least one of: (a) a first difference between a first intended viewing condition associated with the first content item and a second intended viewing condition associated with the common compositing space (which may be needed to support content items not authored for bright-surround viewing); and (b) a second difference between a first intended viewer adaptation level associated with the first content item and a first predicted viewer adaptation level (Step 720). The common compositing space may comprise any common compositing space encompassing both the color space gamut associated with the common compositing space and any intended viewing conditions for the common compositing space (e.g., a dim viewing environment, a bright viewing environment, etc.). Any appropriate adaptation algorithms may be used to modify each displayed content item to the common compositing space. This ensures that multiple displayed content items, e.g., with multiple encoded gamma boosts, saturation levels, and the like may be adapted to a single, system-wide common compositing space. For example, a video that a viewer wishes to display may include a gamma boost corresponding to an intended viewing environment that is a dark surround, but a word processing document the viewer wishes to view on the same display may include a gamma boost corresponding to a bright surround. If adjustments to the content items based on the current ambient viewing conditions around the display device are applied without first transitioning the individual content items into the common compositing space, the resultant gamma boost for the video would be different than the resultant gamma boost for the documents, such that the content items may not be appropriately adjusted for the current ambient viewing conditions. In some embodiments, the common compositing space and/or system-wide display parameters may be chosen based on the reference environments of one or more content items being displayed. For example, if a majority of the content items correspond to a bright surround reference environment, the bright surround reference environment may be chosen as the common compositing space. In some embodiments, the common compositing space may be chosen based on the reference environment of a content item determined to be most important. In some embodiments, the common compositing space may be chosen based on the current viewing environment, reducing the amount of adjustment required to adapt the content items to the current viewing environment. This feature may be useful for stable viewing environments with infrequent or small changes. For example, the common compositing space and corresponding modified display parameters may be an “average” of recent environmental conditions. Then, in some embodiments, the system-wide display parameters may be adjusted based on ambient conditions, such as based on an ambient conditions model; device characteristics, such as based on display brightness, reflection, and leakage; and/or according to explicit user settings. For example, with high dynamic range (HDR) content, the adjustment of a reference white point may decrease the range of brightness levels dedicated to highlights (the so-called "headroom") in the high dynamic range content. The resulting modified display data from Step 720 may then be encoded according to a transfer function associated with the common compositing space (Step 725).

Figure 8:
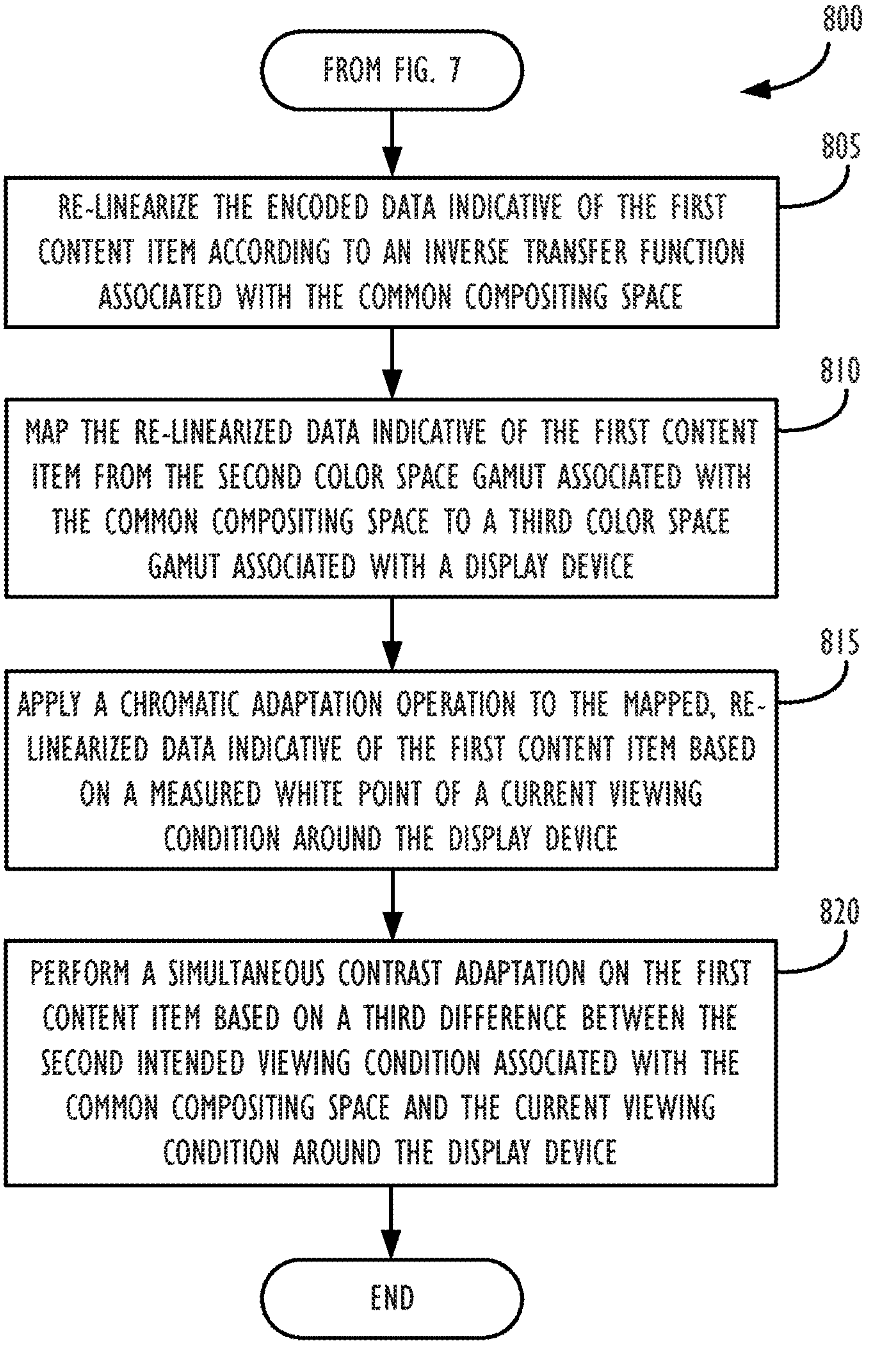
FIG. 8 illustrates, in flowchart form, a process for performing display adjustment based on a dynamic system OOTF, in accordance with one or more embodiments.

Referring now to FIG. 8, another embodiment of a process 800 for performing display adjustment based on a dynamic system OOTF is shown, in flowchart form. In particular, FIG. 8 will detail one exemplary process of taking content from a common compositing space and adapting it based on the current viewing conditions around the display device. First, continuing on from Step 725 of FIG. 7, at Step 805, the process 800 may begin by re-linearizing the encoded data indicative of the first content item according to an inverse transfer function associated with the common compositing space, i.e., to provide for linear processing in the common compositing space. Next, the process 800 may map the re-linearized data indicative of the first content item from the second color space gamut associated with the common compositing space to a third color space gamut associated with the display device (Step 810). Next, the process 800 may apply a chromatic adaptation operation to the mapped, re-linearized data indicative of the first content item based on a measured white point of a current viewing condition around the display device (Step 815). For example, the chromatic adaptation operation may be employed to move the white point from a nominal white point value (e.g., D65) to a white point matching the actual current viewing conditions. Finally, if necessary, the process 800 may perform a simultaneous contrast adaptation operation on the first content item based on a third difference between the second intended viewing condition associated with the common compositing space and the current viewing condition around the display device (Step 820).

In some embodiments, rather than performing the simultaneous contrast adaptation operation based on the current viewing conditions around the display device at Step 820, a "reference preset," e.g., as selected by the viewer or the system, may be used instead. In some cases, e.g., if an extended dynamic range pixel buffer format (e.g., EDR) is used, brightness control mapping may be applied to map the reference white value to the desired reference white brightness value before display. Finally, one or more additional ambient adaptation corrections, such as adapting the display's black point, may be applied to the display data, e.g., if necessary, based on the viewer's predicted adaptation level at the time the content is being displayed.

Exemplary Electronic Device

Figure 9:
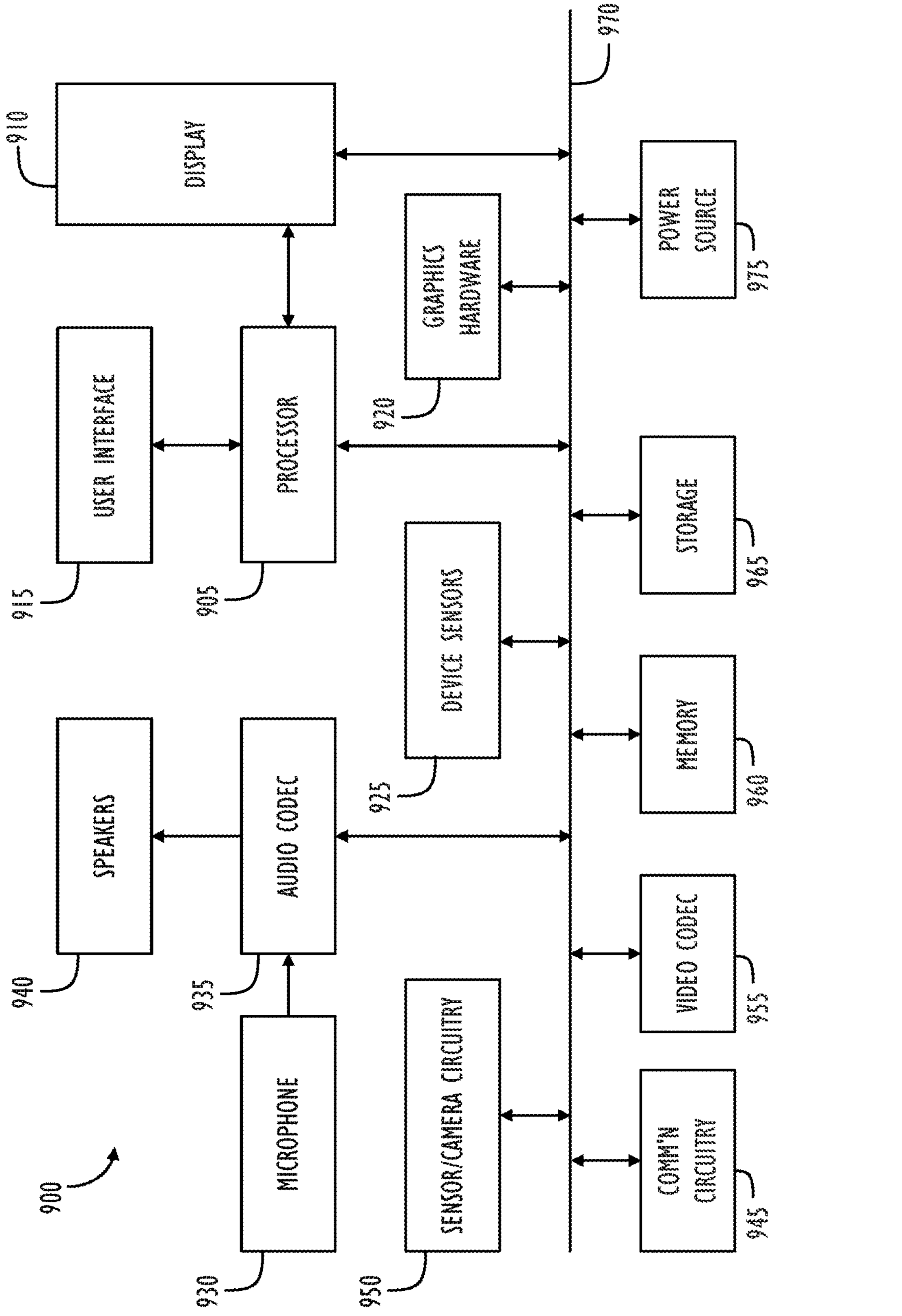
FIG. 9 illustrates a simplified functional block diagram of a device possessing a display, in accordance with one embodiment.

Referring now to FIG. 9, a simplified functional block diagram of a representative electronic device possessing a display is shown, in accordance with some embodiments. Electronic device 900 could be, for example, a mobile telephone, personal media device, HMD, portable camera, or a tablet, notebook or desktop computer system. As shown, electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, image sensor/camera circuitry 950, which may, e.g., comprise multiple camera units/optical sensors having different characteristics (as well as camera units that are housed outside of, but in electronic communication with, device 900), video codec(s) 955, memory 960, storage 965, and communications bus 970.

Processor 905 may execute instructions necessary to carry out or control the operation of many functions performed by device 900 (e.g., such as the generation and/or processing of signals in accordance with the various embodiments described herein). Processor 905 may, for instance, drive display 910 and receive user input from user interface 915. User interface 915 can take a variety of forms, such as a button, keypad, dial, a click wheel, keyboard, display screen and/or a touch screen. User interface 915 could, for example, be the conduit through which a user may view a captured image or video stream and/or indicate particular frame(s) that the user would like to have played/paused, etc., or have particular adjustments applied to (e.g., by clicking on a physical or virtual button at the moment the desired frame is being displayed on the device's display screen).

In one embodiment, display 910 may display a video stream as it is captured, while processor 905 and/or graphics hardware 920 evaluate an ambient conditions model to determine modifications to the display's transfer function or gamma boost, optionally storing the video stream in memory 960 and/or storage 965. Processor 905 may be a system-on-chip such as those found in mobile devices and include one or more dedicated graphics processing units (GPUs). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 perform computational tasks. In one embodiment, graphics hardware 920 may include one or more programmable graphics processing units (GPUs).

Image sensor/camera circuitry 950 may comprise one or more camera units configured to capture images, e.g., images which indicate ambient lighting conditions in the viewing environment and may have an effect on the output of the ambient conditions model, e.g., in accordance with this disclosure. Output from image sensor/camera circuitry 950 may be processed, at least in part, by video codec(s) 955 and/or processor 905 and/or graphics hardware 920, and/or a dedicated image processing unit incorporated within circuitry 950. Images so captured may be stored in memory 960 and/or storage 965. Memory 960 may include one or more different types of media used by processor 905, graphics hardware 920, and image sensor/camera circuitry 950 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to retain computer program instructions or code organized into one or more modules and written in any desired computer programming language. When executed by, for example, processor 905, such computer program code may implement one or more of the methods described herein. Power source 975 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 900.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of displaying content on a display device, comprising:

receiving data indicative of a first content item;

linearizing the data indicative of the first content item according to an inverse transfer function associated with the first content item;

mapping the linearized data indicative of the first content item from a first color space gamut associated with the first content item to a second color space gamut associated with a common compositing space;

modifying the mapped, linearized data indicative of the first content item based on at least one of:

(a) a first difference between a first intended viewing condition associated with the first content item and a second intended viewing condition associated with the common compositing space; and (b) a second difference between a first intended viewer adaptation level associated with the first content item and a first predicted viewer adaptation level;

encoding the modified data indicative of the first content item according to a transfer function associated with the common compositing space;

re-linearizing the encoded data indicative of the first content item according to an inverse transfer function associated with the common compositing space;

mapping the re-linearized data indicative of the first content item from the second color space gamut associated with the common compositing space to a third color space gamut associated with the display device;

applying a chromatic adaptation operation to the mapped, re-linearized data indicative of the first content item based on a measured white point of a current viewing condition around the display device;

performing a simultaneous contrast adaptation on the first content item based on a third difference between the second intended viewing condition associated with the common compositing space and the current viewing condition around the display device;

displaying the first content item on the display device;

receiving data indicative of a second content item;

linearizing the data indicative of the second content item according to an inverse transfer function associated with the second content item;

mapping the linearized data indicative of the second content item from a fourth color space gamut associated with the second content item to the second color space gamut associated with a common compositing space;

modifying the mapped, linearized data indicative of the second content item based on at least one of:

(c) a fourth difference between a third intended viewing condition associated with the second content item and the second intended viewing condition associated with the common compositing space; and (d) a fifth difference between a second intended viewer adaptation level associated with the second content item and a second predicted viewer adaptation level; and encoding the modified data indicative of the second content item according to the transfer function associated with the common compositing space.

2. The method of claim 1, further comprising:

re-linearizing the encoded data indicative of the second content item according to the inverse transfer function associated with the common compositing space;

mapping the re-linearized data indicative of the second content item from the second color space gamut associated with the common compositing space to the third color space gamut associated with the display device;

applying the chromatic adaptation operation to the mapped, re-linearized data indicative of the second content item based on the measured white point of the current viewing condition around the display device;

performing a simultaneous contrast adaptation on the second content item based on the third difference between the second intended viewing condition associated with the common compositing space and the current viewing condition around the display device; and displaying the second content item on the display device.

3. The method of claim 1, further comprising:

receiving data indicative of ambient light conditions around the display device, wherein the current viewing condition around the display device is based, at least in part, on the received data indicative of ambient light conditions.

4. The method of claim 1, wherein displaying the first content item on the display device further comprises:

determining an adjustment to a black point, white point, system gamma, or a combination thereof, of the display device based, at least in part, on the first predicted viewer adaptation level.

5. The method of claim 2, wherein the first content item and the second content item are of different media types.

6. A non-transitory program storage device comprising instructions stored thereon to cause one or more processors to:

receive data indicative of a first content item;

linearize the data indicative of the first content item according to an inverse transfer function associated with the first content item;

map the linearized data indicative of the first content item from a first color space gamut associated with the first content item to a second color space gamut associated with a common compositing space;

modify the mapped, linearized data indicative of the first content item based on at least one of:

(a) a first difference between a first intended viewing condition associated with the first content item and a second intended viewing condition associated with the common compositing space; and (b) a second difference between a first intended viewer adaptation level associated with the first content item and a first predicted viewer adaptation level;

encode the modified data indicative of the first content item according to a transfer function associated with the common compositing space;

re-linearize the encoded data indicative of the first content item according to an inverse transfer function associated with the common compositing space;

map the re-linearized data indicative of the first content item from the second color space gamut associated with the common compositing space to a third color space gamut associated with a display device;

apply a chromatic adaptation operation to the mapped, re-linearized data indicative of the first content item based on a measured white point of a current viewing condition around the display device;

perform a simultaneous contrast adaptation on the first content item based on a third difference between the second intended viewing condition associated with the common compositing space and the current viewing condition around the display device;

display the first content item on the display device;

receive data indicative of a second content item;

linearize the data indicative of the second content item according to an inverse transfer function associated with the second content item;

map the linearized data indicative of the second content item from a fourth color space gamut associated with the second content item to the second color space gamut associated with a common compositing space;

modify the mapped, linearized data indicative of the second content item based on at least one of:

(c) a fourth difference between a third intended viewing condition associated with the second content item and the second intended viewing condition associated with the common compositing space; and (d) a fifth difference between a second intended viewer adaptation level associated with the second content item and a second predicted viewer adaptation level; and encode the modified data indicative of the second content item according to the transfer function associated with the common compositing space.

7. The non-transitory program storage device of claim 6, further comprising instructions stored thereon to cause the one or more processors to:

re-linearize the encoded data indicative of the second content item according to the inverse transfer function associated with the common compositing space;

map the re-linearized data indicative of the second content item from the second color space gamut associated with the common compositing space to the third color space gamut associated with the display device;

apply the chromatic adaptation operation to the mapped, re-linearized data indicative of the second content item based on the measured white point of the current viewing condition around the display device;

perform a simultaneous contrast adaptation on the second content item based on the third difference between the second intended viewing condition associated with the common compositing space and the current viewing condition around the display device; and display the second content item on the display device.

8. The non-transitory program storage device of claim 6, further comprising instructions stored thereon to cause the one or more processors to:

receive data indicative of ambient light conditions around the display device, wherein the current viewing condition around the display device is based, at least in part, on the received data indicative of ambient light conditions.

9. The non-transitory program storage device of claim 6, wherein the instructions to display the first content item on the display device further comprise instructions to cause the one or more processors to:

determine an adjustment to a black point, white point, system gamma, or a combination thereof, of the display device based, at least in part, on the first predicted viewer adaptation level.

10. A device, comprising:

a memory;

a display device; and one or more processors operatively coupled to the memory, wherein the one or more processors are configured to execute instructions causing the one or more processors to:

receive data indicative of a first content item;

linearize the data indicative of the first content item according to an inverse transfer function associated with the first content item;

map the linearized data indicative of the first content item from a first color space gamut associated with the first content item to a second color space gamut associated with a common compositing space;

modify the mapped, linearized data indicative of the first content item based on at least one of:

(a) a first difference between a first intended viewing condition associated with the first content item and a second intended viewing condition associated with the common compositing space; and (b) a second difference between a first intended viewer adaptation level associated with the first content item and a first predicted viewer adaptation level;

encode the modified data indicative of the first content item according to a transfer function associated with the common compositing space;

re-linearize the encoded data indicative of the first content item according to an inverse transfer function associated with the common compositing space;

map the re-linearized data indicative of the first content item from the second color space gamut associated with the common compositing space to a third color space gamut associated with the display device;

apply a chromatic adaptation operation to the mapped, re-linearized data indicative of the first content item based on a measured white point of a current viewing condition around the display device;

perform a simultaneous contrast adaptation on the first content item based on a third difference between the second intended viewing condition associated with the common compositing space and the current viewing condition around the display device;

display the first content item on the display device;

receive data indicative of a second content item;

linearize the data indicative of the second content item according to an inverse transfer function associated with the second content item;

map the linearized data indicative of the second content item from a fourth color space gamut associated with the first content item to the second color space gamut associated with a common compositing space;

modify the mapped, linearized data indicative of the second content item based on at least one of:

(c) a fourth difference between a third intended viewing condition associated with the second content item and the second intended viewing condition associated with the common compositing space; and (d) a fifth difference between a second intended viewer adaptation level associated with the second content item and a second predicted viewer adaptation level; and encode the modified data indicative of the second content item according to the transfer function associated with the common compositing space.

11. The device of claim 10, further comprising instructions stored in the memory to cause the one or more processors to:

re-linearize the encoded data indicative of the second content item according to the inverse transfer function associated with the common compositing space;

map the re-linearized data indicative of the second content item from the second color space gamut associated with the common compositing space to the third color space gamut associated with the display device;

apply the chromatic adaptation operation to the mapped, re-linearized data indicative of the second content item based on the measured white point of the current viewing condition around the display device;

perform a simultaneous contrast adaptation on the second content item based on the third difference between the second intended viewing condition associated with the common compositing space and the current viewing condition around the display device; and display the second content item on the display device.

12. The device of claim 10, further comprising instructions stored in the memory to cause the one or more processors to:

receive data indicative of ambient light conditions around the display device, wherein the current viewing condition around the display device is based, at least in part, on the received data indicative of ambient light conditions.

13. The device of claim 10, wherein the instructions to display the first content item on the display device further comprise instructions to cause the one or more processors to:

determine an adjustment to a black point, white point, system gamma, or a combination thereof, of the display device based, at least in part, on the first predicted viewer adaptation level.

14. The device of claim 11, wherein the first content item and the second content item are of different media types.

* * * * *